(12) United States Patent
Ach

(10) Patent No.: US 7,661,514 B2
(45) Date of Patent: Feb. 16, 2010

(54) ELEVATOR BELT FOR AN ELEVATOR INSTALLATION AND METHOD OF PRODUCING SUCH AN ELEVATOR BELT

(75) Inventor: Ernst Ach, Ebikon (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 11/836,537

(22) Filed: Aug. 9, 2007

(65) Prior Publication Data

US 2008/0067010 A1    Mar. 20, 2008

Related U.S. Application Data

(60) Provisional application No. 60/822,118, filed on Aug. 11, 2006, provisional application No. 60/822,123, filed on Aug. 11, 2006, provisional application No. 60/822,129, filed on Aug. 11, 2006, provisional application No. 60/822,141, filed on Aug. 11, 2006, provisional application No. 60/871,876, filed on Dec. 26, 2006.

(30) Foreign Application Priority Data

| Aug. 11, 2006 | (EP) | .................. 06118816 |
|---|---|---|
| Aug. 11, 2006 | (EP) | .................. 06118817 |
| Aug. 11, 2006 | (EP) | .................. 06118819 |
| Aug. 11, 2006 | (EP) | .................. 06118824 |
| Dec. 22, 2006 | (EP) | .................. 06127128 |

(51) Int. Cl.
*B66B 11/04* (2006.01)
*B66B 11/08* (2006.01)
*F16G 9/00* (2006.01)
*F16G 1/00* (2006.01)

(52) U.S. Cl. ............ 187/251; 187/254; 187/266; 474/260; 474/261; 474/264; 474/268; 156/138

(58) Field of Classification Search .......... 187/251; 474/252, 263, 268, 270, 237–238, 260, 261–262, 474/265; 156/137–139
See application file for complete search history.

(56) References Cited

U.S. PATENT DOCUMENTS

| 2,439,043 | A | | 4/1948 | Evans |
|---|---|---|---|---|
| 3,049,460 | A | * | 8/1962 | Garbin et al. ............... 156/140 |
| 3,221,869 | A | * | 12/1965 | Paasche ..................... 198/847 |
| 3,948,113 | A | | 4/1976 | Stork |
| 3,996,813 | A | | 12/1976 | Henderson et al. |
| 4,078,443 | A | | 3/1978 | Warner et al. |
| 4,177,688 | A | | 12/1979 | Howerton et al. |

(Continued)

FOREIGN PATENT DOCUMENTS

AU         24687 71 A         7/1972

(Continued)

*Primary Examiner*—John Q Nguyen
*Assistant Examiner*—Stefan Kruer
(74) *Attorney, Agent, or Firm*—Fraser Clemens Martin & Miller LLC; William J. Clemens

(57) ABSTRACT

An elevator belt for an elevator installation includes a belt body in which a tensile carrier arrangement with several tensile carriers for transmission of a tension force in a longitudinal direction of the elevator belt is arranged. A profile body which spaces these tensile carriers from one another is arranged between adjacent tensile carriers of the tensile carrier arrangement.

19 Claims, 2 Drawing Sheets

U.S. PATENT DOCUMENTS

| | | | |
|---|---|---|---|
| 4,235,119 | A | 11/1980 | Wetzel |
| 4,265,627 | A | 5/1981 | Imamura |
| 4,305,713 | A | 12/1981 | Imamura |
| 4,330,287 | A * | 5/1982 | Fischer .................. 474/238 |
| 4,773,896 | A | 9/1988 | Bouteiller et al. |
| 4,904,232 | A * | 2/1990 | Kitahama et al. .......... 474/238 |
| 4,956,036 | A | 9/1990 | Sedlacek |
| 5,026,327 | A | 6/1991 | White, Jr. |
| 5,026,444 | A | 6/1991 | Hollaway, Jr. |
| 5,178,586 | A * | 1/1993 | Mizuno et al. ............. 474/266 |
| 5,653,656 | A | 8/1997 | Thomas |
| 6,056,656 | A * | 5/2000 | Kitano et al. ............... 474/268 |
| 6,251,977 | B1 | 6/2001 | Georget et al. |
| 6,419,605 | B1 * | 7/2002 | Takahashi et al. .......... 474/237 |
| 6,609,990 | B2 * | 8/2003 | Kopang ..................... 474/264 |
| 2003/0121729 | A1 * | 7/2003 | Heinz et al. ................. 187/254 |
| 2004/0206579 | A1 | 10/2004 | Baranda |

FOREIGN PATENT DOCUMENTS

| | | |
|---|---|---|
| CA | 2 552 202 A1 | 7/2005 |
| DE | 11 10 397 B | 7/1961 |
| DE | 35 27 640 A1 | 2/1987 |
| DE | 93 09 494 U1 | 8/1993 |
| DE | 198 51 761 A1 | 5/2000 |
| DE | 102 22 015 A1 | 12/2003 |
| DE | 102004030722 A1 | 1/2006 |
| EP | 0 596 713 A1 | 5/1994 |
| EP | 1 060 305 B1 | 12/2000 |
| EP | 1 063 448 A2 | 12/2000 |
| EP | 1396458 A2 * | 3/2004 |
| EP | 1 477 449 A | 11/2004 |
| EP | 0 129 255 A2 | 7/2005 |
| EP | 1 555 234 A1 | 7/2005 |
| EP | 1 555 234 B1 | 5/2006 |
| EP | 1 547 960 A | 6/2006 |
| EP | 1 674 419 A | 6/2006 |
| EP | 1 396 659 B1 | 7/2006 |
| FR | 2 570 066 A1 | 3/1986 |
| FR | 2 827 266 A1 | 1/2003 |
| WO | WO 03/008840 A2 | 1/2003 |
| WO | WO 03/043926 A1 | 5/2003 |
| WO | WO 2005/054569 A | 6/2005 |

* cited by examiner

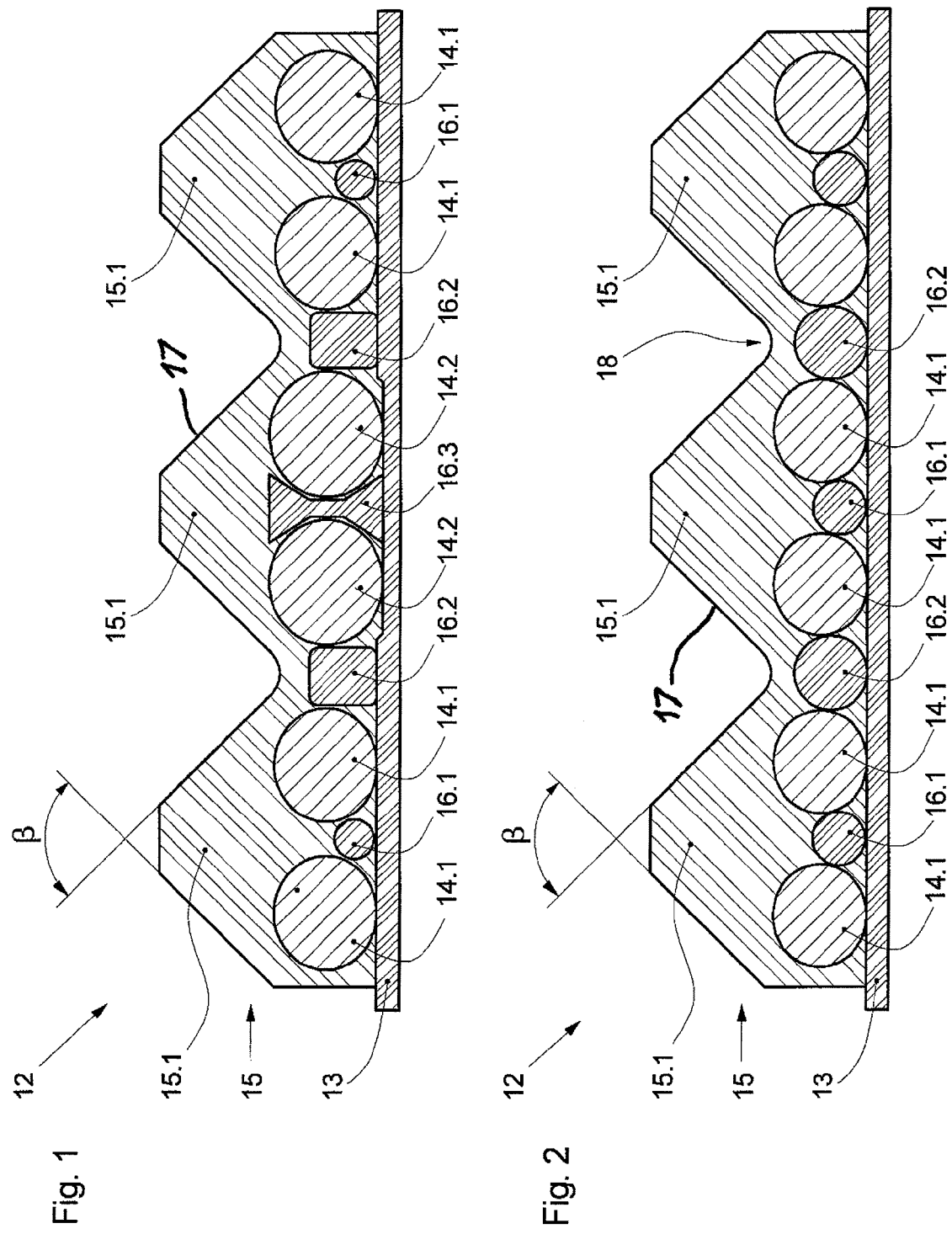

ELEVATOR BELT FOR AN ELEVATOR INSTALLATION AND METHOD OF PRODUCING SUCH AN ELEVATOR BELT

CROSS-REFERENCE TO RELATED APPLICATION

This application claims the benefit of U.S. provisional patent application Ser. No. 60/822,118 filed Aug. 11, 2006, U.S. provisional patent application Ser. No. 60/822,123 filed Aug. 11, 2006, U.S. provisional patent application Ser. No. 60/822,129 filed Aug. 11, 2006, U.S. provisional patent application Ser. No. 60/822,141 filed Aug. 11, 2006, and U.S. provisional patent application Ser. No. 60/871,876 filed Dec. 26, 2006.

FIELD OF THE INVENTION

The present invention relates to an elevator installation with an elevator belt, to an elevator belt for such an elevator installation and to a method of producing such an elevator belt.

BACKGROUND OF THE INVENTION

An elevator installation comprises an elevator car and usually a counterweight, which are movable in an elevator shaft or along free-standing guide devices. For producing the movement the elevator installation has at least one drive with at least one respective drive wheel, which carries the elevator car and the counterweight by way of one or more belts and/or transmits the required drive forces to these. A drive wheel can in that case be formed in a manner known per se as a drive pulley or equally as a wheel with a smaller diameter, particularly also as a drive output shaft of the drive itself.

The elevator car and the counterweight can be supported and driven by way of the same at least one supporting and drive belt, which is guided over the at least one drive wheel. Alternatively, the elevator car and the counterweight can also be coupled together by way of at least one support belt running over a deflecting roller, so that the counterweight rises when the elevator car is lowered and conversely, wherein the drive of the elevator car and the counterweight takes place by a drive unit via at least one separate drive belt. Whereas in drive belts tension forces are transmitted to drive belts by drive wheels in order to move the elevator car or the counterweight, pure support belts are deflected not over drive wheels, but merely over deflecting elements, particularly rotatable or fixed deflecting rollers, and accept the weight force of the elevator car or the counterweight. In most elevator installations the supporting function and driving function are fulfilled by the same at least one supporting and drive belt.

An elevator belt according to the present invention can be used for each of the above-described functions, thus equally as a supporting belt, as a drive belt or as a supporting and drive belt, as one of several belts arranged in parallel or as an individual belt.

Where no distinction is required between drive wheels and deflecting rollers, these are generally termed belt wheels in the following.

An elevator belt with a belt body of polyurethane is known from European patent EP 1 060 305 B1, in which a tensile carrier arrangement with cables of multiply stranded wires for transmission of a tension force in longitudinal direction of the elevator belt is arranged.

When the tensile carriers during production of this elevator belt are embedded in the belt body, the individual tensile carriers can displace relative to one another. An unfavorable arrangement of the tensile carriers in a transverse direction of the belt can thereby arise. For example, two tensile carriers can lie closely adjacent in the belt body or even contact one another. Since the tensile carriers when looping around a belt pulley, particularly a drive wheel, exert, due to the tension forces transmitted by them, impart substantial pressure stresses on the belt body the risk exists that the belt body is damaged by the increased local loading which occurs with closely adjacent, particularly mutually contacting, tensile carriers. In the extreme case tensile carriers lying closely together can cut through the belt body.

If, as in EP 1 060 305 B1, the elevator belt is contoured, the risk additionally exists that tensile carriers during production are positioned in regions of the belt body with smaller wall thickness, which less satisfactorily accept the pressure and shear forces exerted by the tensile carriers and can deflect and thus are exposed to an increased risk of damage.

SUMMARY OF THE INVENTION

An object of the present invention is therefore to provide an elevator belt in which the positioning of the tensile carriers within the belt body is improved.

An elevator belt according to the present invention for an elevator installation comprises a belt body in which a tensile carrier arrangement with at least two tensile carriers for transmission of a tensile force in longitudinal direction of the elevator belt is arranged. The tensile carriers of the tensile carrier arrangement comprise strands or cables, preferably of wires or synthetic material fiber threads, particularly preferably of steel wires. A flexible profile body is arranged between at least two adjacent tensile carriers of the tensile carrier arrangement and spaces these tensile carriers from one another.

Through the profile bodies arranged between two adjacent tensile carriers a minimum spacing of the two tensile carriers from one another can be preset during the production process. It is thereby possible to avoid the two tensile carriers lying too close to one another or even contacting one another, which would lead to a non-uniform force distribution in the elevator belt and a locally higher loading of the belt body, in the elevator belt ready for use.

In a preferred embodiment of the present invention the two adjacent tensile carriers bear in shape-locking manner against the intermediately disposed profile bodies so that mutual relative position thereof is predetermined with a high degree of accuracy. At least one profile body is preferably arranged between several, particularly preferably between all, tensile carriers of the tensile carrier arrangement. The tensile carrier arrangement overall can thereby also be positioned correct in location in the belt body. If, for example, in production of the belt in an extrusion method, tensile carriers and profile bodies adjacent to one another are fed in alternation continuously and correctly in position to the belt extrusion tool and in that case embedded in an extruded belt body, the profile bodies prevent larger deviations of the tensile carriers from their intended position in the belt body.

Tensile carriers which bear against the profile bodies arranged therebetween can advantageously also transmit forces in transverse direction of the elevator belt in that they are mechanically positively supported relative to one another. By contrast to conventional elevator belts in which the tensile carriers can transmit such transverse forces only by way of the usually softer belt body, in the elevator belt according to the invention the permissible loading of the belt body in transverse direction can be increased, which is advantageous in, for example, cases of use in which the elevator belt is guided by lateral flanges on at least one of the belt wheels. In addition, the mechanically positive support of adjacent tensile carriers at the intermediately disposed profile bodies can stiffen the elevator belt in transverse direction, which in turn counteracts deformation of the elevator belt under longitudinal loading and on the other hand ensures dimensional stability of the belt cross-section when the elevator belt is twisted about the longitudinal axis thereof between two belt wheels of an elevator installation.

Preferably all profile bodies have the same cross-section, which enables an equidistant distribution of the tensile carriers and formation of a homogeneous elevator belt. In addition, the effort for production and storage of the profile bodies as well as for the positionally correct arrangement thereof during the production process is produced, since it is not necessary to observe which profile body is arranged between which tensile carriers.

At the same time individual tensile carriers with different spacings from one another can also be produced with profile bodies of the same cross-section in that either a different number of profile bodies is arranged between different tensile carriers or in that profile bodies are used which, for example, have rectangular cross-sections and are embedded between the tensile carriers either in cross position or height position. Thus, for example, it is possible to arrange the tensile carriers in the region of a wedge rib of the belt body with a smaller spacing and at the same time to ensure a greater spacing between adjacent tensile carriers of adjacent wedge ribs. An arrangement of tensile carriers in the thin-walled belt body regions between adjacent wedge ribs can, for example, thereby be avoided.

Alternatively or additionally at least two profile bodies can have different cross-sectional shapes. It is thereby also possible to realize different spacings between each two tensile carriers. Moreover, the cross-sectional shapes and/or cross-sectional sizes of the profile bodies can be adapted to tensile carriers with different external contours, particularly with different diameters, whereby the mutual mechanically positive support thereof is improved.

The profile bodies preferably have substantially circular, oval, T-shaped, double-T-shaped, U-shaped, triangular and/or quadrangular cross-sections. Geometrically simple cross-sectional shapes, for example, circular, oval, triangular or quadrangular cross-sections, are simple to produce, for example by extrusion. In the case of cross-sections symmetrical with respect to a point, particularly in the case of round or square cross-sections, it is in advantageous manner not necessary to observe placement of the profile bodies with correct orientation during the production process. Other cross-sectional shapes, especially double-T-shaped and hourglass-shaped cross-sections, can also improve the locationally correct positioning of the tensile carriers in direction of the belt thickness.

The profile bodies extend in longitudinal direction of the elevator belt preferably substantially over the entire length of the elevator belt, advantageously parallel to the tensile carriers. They thus ensure overall the positionally correct arrangement of the tensile carriers and can in addition transmit a part of the tension forces of the elevator belt so that the strength thereof in longitudinal direction advantageously increases.

The profile bodies are preferably made of a thermoplastic synthetic material, particularly polyamide (PA), polyethylene (PE), polyester, particularly polyethyleneterephthalate (PET) and/or polycarbonate (PC), polypropylene (PP), polybutyleneterephthalate (PBT), polyethersulfone (PES), polytetrafluorethylene (PTFE), polyvinylchloride (PVC) or a polyblend of several thermoplastic synthetic materials. Such profile bodies have a sufficient elasticity in bending as well as a sufficient strength for support of the tensile carriers during the production process, are economic to produce and in preferred manner increase the weight of the overall elevator belt only slightly or can even reduce it.

With particular preference the belt body has, on a traction side, one or more wedge ribs, which are oriented in longitudinal direction of the elevator belt, for engagement in substantially complementary wedge grooves of a drive wheel. By virtue of the wedge effect resulting in that case a higher drive capability can be provided for the same longitudinal force. Moreover, the elevator belt is in advantageous manner guided by the wedge ribs in transverse direction on the belt wheels.

The positionally correct arrangement of the tensile carriers in the belt body is advantageous particularly in such wedge rib belts, since the tensile carriers can thereby be positioned correctly in location with respect to the wedge ribs. As mentioned in the foregoing, it is possible, for example, to avoid the tensile carriers being embedded in the belt body in the region of a groove base lying between adjacent wedge ribs.

The wedge ribs preferably have a flank angle of 60° to 120°, wherein the region from 80° to 100° is to be preferred. The angle present between two side surfaces (flanks) of a wedge rib is termed flank angle. This region has proved to be an ideal region in which on the one hand jamming of the wedge ribs in the wedge grooves of the drive wheel and thus transverse oscillations in the elevator belt are avoided and on the other hand a secure guidance of the elevator belt on the belt wheels provided with wedge grooves is guaranteed.

An elastomer, preferably polyurethane, polychloroprene, natural rubber or ethylene-propylene-diene rubber especially comes into consideration as material for the belt body. A belt body of such a material is simple to produce, for example by extruding, and is particularly well-suited to introduce traction forces from a drive wheel into the tensile carriers. For this purpose the belt body can have, on a traction side intended for engagement with such a drive wheel, a coating further increasing the coefficient of friction and thus the drive capability. At the same time, the coating can also have a lower coefficient of friction if, for example, due to the wedge effect of the wedge ribs a sufficiently high drive capability is already guaranteed. Jamming of the wedge ribs in the grooves of the drive wheel can thereby be avoided. Such a friction-reducing coating can, in addition, increase the wear-resistance and thus the service life of the elevator belt.

The belt body can be connected, on a rear side of the belt body lying opposite the traction side intended for engagement with a drive wheel, with a back layer, which is made from, in particular, a thermoplastic synthetic material, particularly from polyamide (PA), polyethylene (PE), polyester, particularly polyethyleneterephthalate (PET) and/or polycarbonate (PC), polypropylene (PP), polybutyleneterephthalate (PBT), polyethersulfone (PES), polytetrafluorethylene (PTFE), polyvinylchloride (PVC) or polyblend (mixture of two or more different synthetic materials) and/or a fabric of such a thermoplastic synthetic material. The fabric can be embedded in a further one of these thermoplastic synthetic materials or saturated by this.

Such a back layer can form a wear-resistant and low-friction rear side of the elevator belt, which is particularly of advantage when this loops by its rear side around deflecting rollers and has to be guided thereon in transverse direction, for example by lateral flanges. With particular preference the rear side of the elevator belt therefore has, together with a deflecting roller, a coefficient of friction of at most 0.35, preferably at most 0.3 and particularly preferably at most 0.25. For this purpose the back layer can additionally have, on its rear side remote from the traction side, a wear-resistant and/or low-friction coating which increases the service life or the efficiency of an elevator belt according to the invention.

One or more intermediate layers can be arranged between the belt body and the back layer. Such an intermediate layer can, for example, improve the connection between wedge rib arrangement and back layer. Additionally or alternatively, an intermediate layer can stiffen the elevator belt in its longitudinal and/or transverse direction or damp oscillations of the elevator belt. An intermediate layer can for these purposes comprise, in particular, a fabric.

The back layer can also have one or more wedge ribs on its rear side. It is thus achieved in advantageous manner that the elevator belt is also guided during running around belt wheels on which it rests by its rear side. The number of wedge ribs on the back layer in that case does not have to correspond with the number of wedge ribs of the wedge rib arrangement.

In a particularly preferred embodiment of the elevator belt at least one tensile carrier or at least one profile body bears against the back layer. This preferably applies to all tensile carriers and all profile bodies. The positioning of the tensile carriers and/or profile bodies correct in location is thereby also guaranteed in the direction perpendicular to the back layer.

Profile bodies and/or back layer can be coated with an adhesion promoter for connection of the belt body with the profile body or the back layer. A thermo-adhesive reacting during extruding, for example, comes into consideration for this purpose. By virtue of the adhesion promoter the connection between belt body and profile body or between belt body and back layer is improved, whereby the service life of the elevator belt increases. In addition, tension forces can thus be better introduced into the profile bodies and transmitted by these.

The production of an elevator belt according to the present invention is preferably carried out in an extrusion method. In this extrusion method, tensile carriers and profile bodies and in a given case also a back layer are fed continuously and correct in position to a belt extrusion tool, from which an elastomer strand, which is rendered flowable by heat and shaped by a shaping nozzle and which forms the belt body and receives the fed tensile carriers as also the profile bodies, is continuously extruded. The belt body is optionally simultaneously connected with a back layer. The profile bodies prevent, during the extrusion process, greater deviations of the tensile carriers from their intended position in the belt body.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 shows a cross-section through an elevator belt according to a first embodiment of the present invention;

FIG. 2 shows a cross-section through an elevator belt according to a second embodiment of the present invention.

DESCRIPTION OF THE PREFERRED EMBODIMENT

Figure 3:
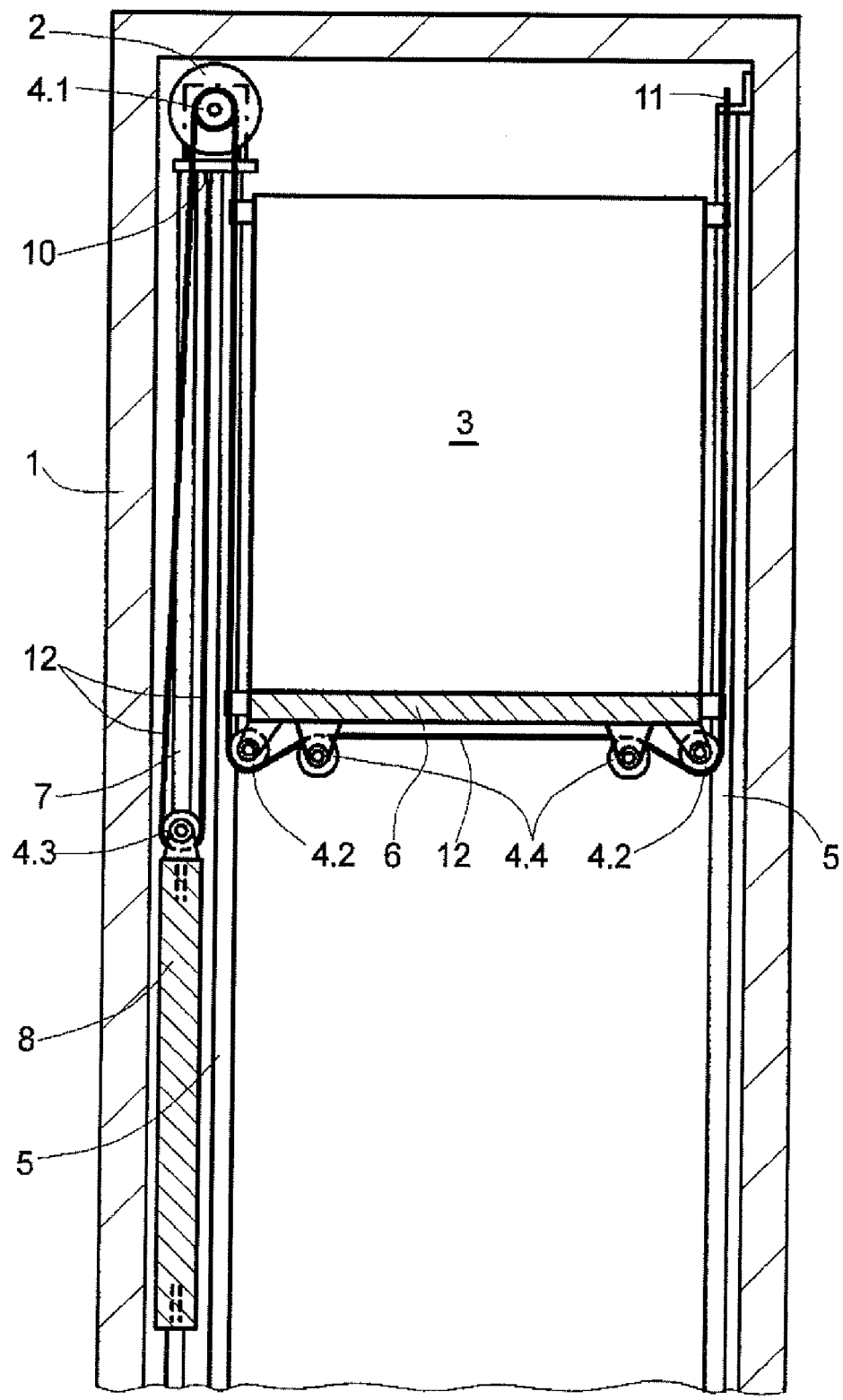
FIG. 3 shows a section, which is parallel to an elevator car front, through an elevator installation with a belt according to an embodiment of the present invention.

The U.S. provisional patent application Ser. No. 60/822,118 filed Aug. 11, 2006, the U.S. provisional patent application Ser. No. 60/822,123 filed Aug. 11, 2006, the U.S. provisional patent application Ser. No. 60/822,129 filed Aug. 11, 2006, the U.S. provisional patent application Ser. No. 60/822,141 filed Aug. 11, 2006, and the U.S. provisional patent application Ser. No. 60/871,876 filed Dec. 26, 2006 are hereby incorporated herein by reference.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 shows an elevator belt 12 according to a first embodiment of the present invention. This comprises a belt body 15 of polyurethane with individual wedge ribs 15.1 and a back layer 13 of polyamide connected with the belt body.

The wedge ribs 15.1 have a flank angle $\theta$ of 90° and form a traction side of the elevator belt 12 (at the top in FIG. 1) for engagement with a drive wheel 4.1 (see FIG. 3). In order to vary a coefficient of friction given between the wedge ribs 15.1 consisting of polyurethane and the drive wheel 4.1 the elevator belt can be provided on its traction side with a coating 17. For example, the flanks of the wedge ribs 15.1 coming into contact with a substantially complementary wedge rib profile of the drive wheel 4.1 can be coated with a thin polyamide film. For simplification of production, the entire traction side can at the same time also be coated with such a film.

In each wedge rib 15.1 two tensile carriers 14.1, 14.2 are arranged parallel to one another in the base of the rib facing the back layer 13. The tensile carriers 14.1, 14.2 are constructed in a manner, not illustrated in more detail, as a steel wire cable of several strands stranded together, which in turn are constructed from individual single wires of steel stranded together.

A respective profile body 16.1, 16.2 of polyamide is arranged between each two adjacent tensile carriers 14.1, 14.2. In that case round profile carriers 16.1 are positioned between two adjacent tensile carriers 14.1 of outer wedge ribs. A double-T-shaped or hourglass-shaped profile body 16.3 is arranged between the two adjacent wedge ribs 14.2 of the middle wedge rib 15.1, which has a greater diameter. Adjacent tensile carriers 14.1, 14.2 of adjacent wedge ribs 15.1 are spaced apart by substantially rectangular profile bodies 16.2.

The tensile carriers 14.1, 14.2 and the profile bodies 16.1, 16.2 bear against one another in shape-locking manner in belt transverse direction (left-to-right in FIG. 1). It is thus achieved that the tensile carriers 14.1, 14.2 are mutually supported in the said direction by way of the profile bodies 16.1, 16.2, from which a higher transverse stiffness of the entire elevator belt 12 results.

For the purposes of illustration the tensile carriers 14.1, 14.2 in the first form of embodiment according to FIG. 1 have different diameters and the profile bodies 16.1, 16.2 and 16.3 have different cross-sectional shapes. Tensile carriers with different diameters are in that case so placed that the centers thereof lie on the same straight lines. The back profile 13 is for this purpose preferably executed with a variable thickness.

In another embodiment, which is not illustrated, in each instance the tensile carriers and/or the profile bodies have the same cross-sections, which facilitates manufacture and stock-keeping and leads to a homogeneous elevator belt 12. In a further embodiment, which is illustrated in FIG. 2, all profile bodies 16.1, which are respectively arranged in the center of a wedge rib 15.1, have the same cross-sections. All profile bodies 16.2, which are respectively arranged between two adjacent wedge ribs 15.1, similarly have the same cross-sections, but at least have a greater width than the profile bodies 16.1 arranged within a wedge rib 15.1 and thus ensure that the tensile carriers 14.1 are spaced sufficiently far from the groove base 18 formed between adjacent wedge ribs 15.1.

The production of an elevator belt 12 according to one embodiment of the present invention is preferably carried out in an extrusion method. In that case the tensile carriers 14.1, 14.2, the profile bodies 16.1, 16.2 and 16.3 and the back layer 13 are fed continuously and correct in position to a belt extrusion tool, wherein tensile carriers and profile bodies are guided in such a manner that virtually no intermediate space is present therebetween. An elastomer strand, which is rendered flowable by heat and shaped by a shaping nozzle and which forms the belt body 15, receives the fed tensile carriers as also the profile bodies and simultaneously connects with the back layer 13, is continuously extruded from the belt extrusion tool. The profile bodies prevent, during the described production process, larger lateral deflections of the tensile carriers from their intended position in the belt body.

The back layer 13 forms at its rear side remote from the belt body 15 (at the bottom in FIG. 1) a slide surface which on deflection of the elevator belt around a deflecting wheel 4.2 (see FIG. 3) stands in contact with the periphery thereof. This slide surface of polyamide has a low coefficient of friction and at the same time a high level of abrasion resistance. Advantageously, the guidance forces, which are required for guidance of the elevator belt on deflecting wheels, between lateral flanges of the deflecting wheels and the lateral boundaries of the elevator belt are thus diminished. The lateral friction loading during deflection of the elevator belt and thus the required drive power of the elevator installation are thereby reduced. At the same time, the service life of the elevator belt and the deflecting wheels are prolonged.

FIG. 3 schematically shows a section through an elevator system, which is installed in an elevator shaft 1, with an elevator belt 12 according to an embodiment of the present invention. The elevator system comprises a drive 2, which is fixed in the elevator shaft 1, with a drive wheel 4.1, an elevator car 3, which is guided at car guide rails 5, with deflecting rollers 4.2 mounted below the car floor 6 and serving as car support rollers, a counterweight 8, which is guided at counterweight guide rails 7, with a further deflecting roller 4.3 serving as counterweight support roller, as well as the elevator belt 12 according to the above-explained first or second embodiment of the invention, which supports the elevator car and the counterweight and transmits thereto the drive force from the drive wheel 4.1 of the drive unit 2.

The elevator belt 12 is fastened to a first belt fixing point 10 at its end below the drive wheel 4.1. From this point it extends downwardly to the deflecting roller 4.3 serving as counterweight support roller, loops around this and extends from this out to the drive wheel 4.1, loops around this and runs downwardly along the car wall at the counterweight side, loops in each instance by 90° around a respective deflecting roller 4.2, which is mounted below the elevator car 3 and serves as car support roller, on either side of the elevator car and runs upwardly along the car wall, which is remote from the counterweight 8, to a second belt fixing point 11.

The plane of the drive wheel 4.1 can be arranged at right angles to the car wall at the counterweight side and its vertical projection can lie outside the vertical projection of the elevator car 3. It is therefore to be preferred that the drive wheel 4.1 has a small diameter so that the spacing between the car wall at the left side and the wall opposite thereto of the elevator shaft 1 can be as small as possible. Moreover, a smaller drive wheel diameter enables use of a gearless drive motor with relatively low drive torque as drive unit 2.

The drive wheel 4.1 and the deflecting roller 4.3 serving as counterweight support roller are provided at the peripheries thereof with wedge grooves which are formed to be substantially complementary with the wedge ribs 15.1 of the elevator belt 12. Where the elevator belt 12 loops around one of the belt wheels 4.1 or 4.3 the wedge ribs 15.1 arranged on its contact side lie in corresponding wedge grooves of the belt wheel, whereby excellent guidance of the elevator belt on these belt wheels is guaranteed. Moreover, the traction capability is improved by a wedge effect arising between the wedge grooves of the belt wheel 4.1, which serves as drive wheel, and the wedge ribs 15.1 of the belt 12.

In the elevator system illustrated in FIG. 3 the looping around of the deflecting rollers 4.2, which serve as car support rollers, below the elevator car 3 takes place in such a manner that the contact side, which has the wedge ribs, of the elevator belt is remote from the periphery of the deflecting rollers 4.2. The elevator belt in that case bears by its back layer against the deflecting rollers 4.2, wherein this back layer, as described in the foregoing, has a low coefficient of friction relative to the deflecting rollers 4.2. In order to guarantee lateral guidance of the elevator belt in this region two additional guide rollers 4.4, which are provided with wedge grooves which co-operate with the wedge grooves of the elevator belt 12 as a lateral guide, are mounted at the car floor 6.

In a modification, which is not illustrated, of the aforedescribed embodiments the rear side of the elevator belt 12 and the deflecting rollers 4.2 serving as car support rollers also have complementary wedge ribs. When the car support rollers below the elevator car 3 are looped around an excellent lateral guidance of the elevator belt 12 on the deflecting rollers 4.2 serving as car support rollers is therefore given, since the elevator belt has wedge ribs also on its side facing the deflecting rollers 4.2 serving as car support rollers. The guide rollers 4.4 illustrated in FIG. 3 and explained in the foregoing are redundant in this embodiment.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator belt for an elevator installation, comprising:
a belt body in which a plurality of tensile carriers formed as strands or cables for transmission of a tension force in a longitudinal direction of the elevator belt is arranged; and
wherein a plurality of discrete profile bodies is embedded in the belt body and extends in the longitudinal direction of the elevator belt, each of said profile bodies is arranged between adjacent tensile carriers and spaces said adjacent tensile carriers from one another, said belt body, said tensile carriers, and said profile bodies are formed from different materials from each other and at least two of said profile bodies having different cross-sectional shapes from each other.

2. The elevator belt according to claim 1 wherein said tensile carriers are arranged in a common plane.

3. The elevator belt according to claim 1 wherein each of said profile bodies has a cross-sectional shape that is one of circular, oval, T-shaped, double T-shaped, U-shaped, triangular and quadrangular.

4. The elevator belt according to claim 1 wherein each said profile body is made from a thermoplastic synthetic material selected from a group consisting of polyamide, polyethylene, polyester, polyethyleneterephthalate, polycarbonate, polypropylene, polystyrol, polyacetal, polybutyleneterephthalate, polyethersulfone, polyphenylenesulfide, polytetrafluoroethylene, polyetheretherketone, polyimide, polyvinylchloride, and polyblends of several thermoplastic synthetic materials.

5. The elevator belt according to claim 1 wherein said belt body is made from an elastomer selected from a group consisting of polyurethane, polychloroprene, natural rubber and ethylene-propylene-diene rubber.

6. The elevator belt according to claim 1 wherein said belt body has a coating on a traction side for engagement with a drive wheel.

7. The elevator belt according to claim 1 wherein said belt body has on a traction side at least one wedge rib for engagement with a complementary groove of a drive wheel.

8. The elevator belt according to claim 1 wherein the belt body has on a rear side, opposite a traction side for engagement with a drive wheel, a back layer made from a thermoplastic synthetic material selected from a group consisting of polyamide, polyethylene, polyester, polyethyleneterephthalate, polycarbonate, polypropylene, polybutyleneterephthalate, polyethersulfone, polytetrafluorethylene, polyvinylchloride and polyblends of a thermoplastic synthetic material.

9. The elevator belt according to claim 8 wherein said tensile carriers and said profile body bear against said back layer of said belt body.

10. An elevator belt for an elevator installation, comprising:
a belt body in which a plurality of tensile carriers formed as strands or cables for transmission of a tension force in a longitudinal direction of the elevator belt is arranged in a common plane; and
wherein a plurality of discrete profile bodies is embedded in the belt body and extends in the longitudinal direction of the elevator belt, each of said profile bodies is arranged between adjacent ones of said tensile carriers and spaces said adjacent tensile carriers from one another, said belt body, said tensile carriers, and said profile bodies are formed from different materials from each other, said profile bodies having circular cross-sectional shapes with at least two of said profile bodies having different diameters from each other.

11. The elevator belt according to claim 10 wherein each said profile body is made from a thermoplastic synthetic material selected from a group consisting of polyamide, polyethylene, polyester, polyethyleneterephthalate, polycarbonate, polypropylene, polystyrol, polyacetal, polybutyleneterephthalate, polyethersulfone, polyphenylenesulfide, polytetrafluoroethylene, polyetheretherketone, polyimide, polyvinylchloride, and polyblends of several thermoplastic synthetic materials.

12. The elevator belt according to claim 10 wherein said belt body is made from an elastomer selected from a group consisting of polyurethane, polychloroprene, natural rubber and ethylene-propylene-diene rubber.

13. The elevator belt according to claim 10 wherein said belt body has a coating on a traction side for engagement with a drive wheel.

14. The elevator belt according to claim 10 wherein said belt body has on a traction side at least one wedge rib for engagement with a complementary groove of a drive wheel.

15. The elevator belt according to claim 10 wherein the belt body has on a rear side, opposite a traction side for engagement with a drive wheel, a back layer made from a thermoplastic synthetic material selected from a group consisting of polyamide, polyethylene, polyester, polyethyleneterephthalate, polycarbonate, polypropylene, polybutyleneterephthalate, polyethersulfone, polytetrafluorethylene, polyvinylchloride and polyblends of a thermoplastic synthetic material.

16. The elevator belt according to claim 15 wherein said tensile carriers and said profile body bear against said back layer of said belt body.

17. An elevator belt for an elevator installation, comprising:
a belt body in which a plurality of tensile carriers formed as strands or cables for transmission of a tension force in a longitudinal direction of the elevator belt is arranged in a common plane; and
wherein a plurality of discrete profile bodies is embedded in the belt body and extends in the longitudinal direction of the elevator belt, each of said profile bodies is arranged between adjacent ones of said tensile carriers and spaces said adjacent tensile carriers from one another, said belt body, said tensile carriers, and said profile bodies are formed from different materials from each other, said belt body having on a rear side, which is opposite a traction side for engagement with a drive wheel, a back layer formed from a thermoplastic synthetic material, and said tensile carriers and said profile bodies bear against said back layer
wherein one of a) at least two of said profile bodies have a circular cross-sectional shape, the shapes being of different diameters from each other, and b) at least two of said profile bodies have different cross-sectional shapes from each other.

18. The elevator belt according to claim 17 wherein each said profile body has a cross-sectional shape that is one of circular, oval, T-shaped, double T-shaped, U-shaped, triangular and quadrangular.

19. The elevator belt according to claim 17 wherein said back layer is made from a thermoplastic synthetic material selected from a group consisting of polyamide, polyethylene, polyester, polyethyleneterephthalate, polycarbonate, polypropylene, polybutyleneterephthalate, polyethersulfone, polytetrafluorethylene, polyvinylchloride and polyblends of a thermoplastic synthetic material.

* * * * *